United States Patent
Nelson et al.

(10) Patent No.: US 12,481,042 B2
(45) Date of Patent: Nov. 25, 2025

(54) TIME OF FLIGHT SENSOR

(71) Applicant: ams International AG, Jona (CH)

(72) Inventors: Doug Nelson, Eindhoven (NL);
Pradeep Hegde, Eindhoven (NL);
Timothy Cogan, Eindhoven (NL)

(73) Assignee: AMS INTERNATIONAL AG, Rapperswil (CH)

( * ) Notice: Subject to any disclaimer, the term of this patent is extended or adjusted under 35 U.S.C. 154(b) by 1088 days.

(21) Appl. No.: 17/600,925

(22) PCT Filed: Apr. 2, 2020

(86) PCT No.: PCT/EP2020/059449
§ 371 (c)(1),
(2) Date: Oct. 1, 2021

(87) PCT Pub. No.: WO2020/201452
PCT Pub. Date: Oct. 8, 2020

(65) Prior Publication Data
US 2022/0196812 A1    Jun. 23, 2022

Related U.S. Application Data

(60) Provisional application No. 62/953,446, filed on Dec. 24, 2019, provisional application No. 62/828,157, filed on Apr. 2, 2019.

(51) Int. Cl.
*G01S 7/48*       (2006.01)
*G01S 7/4865*   (2020.01)
(Continued)

(52) U.S. Cl.
CPC ............ *G01S 7/497* (2013.01); *G01S 7/4865* (2013.01); *G01S 7/4876* (2013.01); *G01S 17/14* (2020.01); *G01S 17/36* (2013.01)

(58) Field of Classification Search
USPC ............................................... 356/4.01, 5.01
See application file for complete search history.

(56) References Cited

U.S. PATENT DOCUMENTS 9,268,013 B2 *   2/2016  Rieger ................... G01S 17/18
10,725,155 B2 *  7/2020  Rieger ................... G01S 17/42
(Continued)

FOREIGN PATENT DOCUMENTS

AT      513402 B1     9/2014
EP      3460509 A1    3/2019

OTHER PUBLICATIONS

International Search Report and Written Opinion dated Jul. 17, 2020 for corresponding International Application No. PCT/EP2020/059449.

*Primary Examiner* — James R Hulka
(74) *Attorney, Agent, or Firm* — Tarolli, Sundheim, Covell & Tummino LLP (57) ABSTRACT

Time of Flight Sensor A method of measuring optical crosstalk in a time of flight sensor, which comprises a substantially transparent cover covering a light emitter and one or more photodetectors. The method comprises emitting a series of pulses of light from the light emitter; and using the one or more photodetectors to obtain a distribution of times at which at least one photodetector of the one or more photodetectors detected photons after each emission of the series of pulses of light. The method further comprises recording one or more parameters of the earliest peak if the distribution comprises two or more separate peaks.

18 Claims, 4 Drawing Sheets

(51) Int. Cl.
*G01S 7/487* (2006.01)
*G01S 7/497* (2006.01)
*G01S 17/14* (2020.01)
*G01S 17/36* (2006.01)

(56) References Cited

U.S. PATENT DOCUMENTS

| | | | |
|---|---|---|---|
| 11,073,616 B2 * | 7/2021 | Rieger | G01S 17/87 |
| 2012/0257186 A1 * | 10/2012 | Rieger | G01S 17/18 |
| | | | 356/5.01 |
| 2018/0224528 A1 * | 8/2018 | Rieger | G01S 17/42 |
| 2019/0137625 A1 * | 5/2019 | Rieger | G01C 7/02 |

* cited by examiner

TIME OF FLIGHT SENSOR

RELATED APPLICATIONS

The present invention is a U.S. National Stage under 35 USC 371 patent application, claiming priority to Ser. No. PCT/EP2020/059449, filed on 2 Apr. 2020; which claims priority from U.S. Provisional Application No. 62/828,157 filed 2 Apr. 2019; and U.S. Provisional Application No. 62/953,446 filed 24 Dec. 2019, the entirety of each of which are incorporated herein by reference.

Time of flight (ToF) sensors are sensors which determine the distance to a target by emitting light and detecting reflections of the light from the target. Time of flight sensors may be direct time of flight sensors, which directly measure the time between the emission and the detection of the reflection, or indirect time of flight sensors, which emit modulated and indirectly measure the time between the emission and the detection of a reflection by measuring the phase difference between the emitted light and the detected reflection.

In time of flight sensors, not all of the light detected by the sensor may have been originally been emitted by the sensor and then reflected from the target. The sensor may also detect light originating from other sources in the environment and/or light reflected from objects other than a target, this can create background noise. Light detected by the sensor which is not an emission from the sensor and reflected from the target is sometimes referred to as optical crosstalk.

The emitters and the detectors of time of flight sensors are enclosed by transparent covers such as sheets of glass. In some time of flight sensors, the emitter and the detector are located within separate adjacent cavities covered by separate transparent covers. In other time of flight sensors, both the emitter and the detector are located beneath a single transparent cover, either in the same cavity or in separate cavities behind a shared cover.

In time of flight sensors with only a single transparent cover, a major source of optical crosstalk is light from the emitter which is reflected off the cover, or off contamination on the cover (sometimes referred to as smear or smudge). In sensors with the emitter and the detector in separate cavities between a single cover, light from the emitter may be totally internally reflected within the cover to reach the emitter, resulting in optical crosstalk. As the cover is close to the emitter and detector, optical crosstalk reflected off the cover will have travelled a relatively short distance and so will be recorded as having a relatively short time of flight.

In some time of flight sensors, the distance to target is determined by averaging the distances travelled by all of the photons detected by the detector over the course of a measurement. In such sensors, optical crosstalk reflected off a cover as described above will reduce the measured range to the target, thereby decreasing the accuracy of the sensors.

In other time of flight sensors, the distance to a target is determined by measuring the difference between the time of flight of reflections from the target, and reflections from the cover (for example, by measuring the separation between two peaks in a histogram). However, in these sensors it can be difficult to measure the distance of objects close to the sensor as light reflected off the target and the glass may overlap in time or may be otherwise difficult to distinguish.

The level of optical crosstalk reflected off the glass is therefore measured and calibrated for in some time of flight sensors.

Existing methods of measuring the optical cross talk reflected off the cover of a time of flight sensor include making calibration time of flight measurements where no target is present or in range, for example by taking measurements in a sufficiently large room, or while the sensor is aimed at the night sky. Other methods include making time of flight measurements while covering the cover of the sensor—or the portion of the cover over the detector—with a light blocking or absorbing material, such that only light reflected off the cover can reach the detector. The amount of light detected by the sensor is then recorded as the amount of optical crosstalk for calibrating the sensor.

These calibration methods require taking specific measurements to determine the level optical cross talk reflected off the cover in order to determine the level to calibrate the sensor to. However, in the event that the density of external contaminants on the cover, such as dirt or oil, changes, the level of optical crosstalk reflected off the cover will change and the calibration of the sensor will become inaccurate.

Renesas® Electronics Application Note AN1983 Best Practices for TOF Crosstalk Calibration discloses known methods of measuring crosstalk in time of flight sensors.

STATEMENT OF THE INVENTION

According to an embodiment, there is provided a method of measuring optical crosstalk in a time of flight sensor comprising a substantially transparent cover covering a light emitter and one or more photodetectors. The method comprises: emitting a series of pulses of light from the light emitter and using the one or more photodetectors to obtain a distribution of times at which at least one photodetector of the one or more photodetectors detected photons after each emission of the series of pulses of light. The method further comprises, if the distribution comprises two or more separate peaks, recording one or more parameters of the earliest peak.

The method advantageously allows optical crosstalk due to reflections off the cover or material thereon to be measured without performing specific calibration measurements in specific circumstances. The method further advantageously allows optical crosstalk due to reflections off the cover or material thereon to be measured during measurements in which the distance to a target is also measured.

The distribution of times at which the at least one photodetector detected photons after each emission of the series of pulses of light may comprise optical crosstalk, which may include background or noise light from sources other than the light emitter and/or light emitted from the light emitter and reflected off the cover or material thereon. If no object is present within the range and field of view the at least one photodetectors, the distribution may comprise background noise with a single peak at a time corresponding to time taken for a photon emitted by the light emitter to reflect off the cover or material thereon to be detected by one of the at least one photodetector.

If, when performing the method, the distribution of times at which the at least one photodetector detected photons after each emission of the series of pulses of light comprises only a single peak, this peak may be due to light reflecting off the cover or material thereon only, or may be due to both light reflecting off the cover or material thereon, and light reflecting off a target close to the cover, such that the otherwise separate cover reflection peak and target peak overlap and combine to form a single peak. In this situation it may not be possible to accurately determine the level of optical crosstalk due to reflections off the glass.

If instead, the distribution comprises two or more separate peaks then the earliest peak may be assumed to be produced by optical crosstalk reflections off the cover only and the one or more later peaks may be assumed to be produced by reflections off targets. The possibility of the earliest peak including reflections from a target close to the cover may be discarded as such a target would block light from other more distant targets, preventing the later separate peaks. As in this circumstance, the first peak may be assumed to be entirely a consequence of optical crosstalk reflections off the cover, one or more parameters off the peak is recorded to measure this optical crosstalk. This measurement may advantageously be used to calibrate the sensor to compensate for this optical crosstalk.

The method therefore advantageously allows optical crosstalk calibration measurements to be made during normal use of a time of flight sensor, whenever a measurement is made which detects a target sufficiently distant from the cover. This may allow the level of optical crosstalk from reflections from the cover or material thereon to be calibrated and compensated for, without specific calibration measurements being made by a user. In some embodiments, the sensor may perform measurements according to the method automatically and/or on a schedule.

The time of flight sensor comprises a substantially transparent cover covering a light emitter and one or more photodetectors.

The sensor comprises a cover or window covering the emitter and the one or more photodetectors, and which is at least substantially transparent and may be entirely transparent. The method may be for measuring optical crosstalk due to reflections of light emitted by the light emitter and reflected off the cover and/or material thereon.

The emitter and the one or more photodetectors may be in a shared indent or cavity beneath the cover, or the emitter may be in a first indent or cavity beneath the cover and the one or more photodetectors may be in a second indent or cavity beneath the cover. The cover is preferably transparent, and may be formed of glass or plastic.

The cover may protect the one or more photodetectors and the light emitter from impacts, dirt or debris and may provide additional optical filtering for the sensor. In use, when the pulses of light are emitted to perform time of flight and/or calibration measurements, some of the light may be reflected off the cover to the one or more photodetectors.

In embodiments where the emitter and the one or more photodetectors are in separate cavities or indents beneath the cover, or wherein a barrier is provided between the emitter and the one or more photodetectors within a shared indent or cavity, light may be unable to pass from the emitter to the one or more photodetectors by reflecting off the exterior of the cover inside the cavity or indent. However, light from the emitter may be totally internally reflected within the cover, and thereby pass between the separate indents or cavities to the one or more photodetectors through the inside of the cover.

In embodiments where the emitter and the photodetector are within the same indent or cavity and are not separated, light may both be reflected off the exterior of the cover and totally internally reflected within the cover to reach the one or more photodetectors.

Photons reflected off the cover and/or material thereon will be detected at earlier times after their emission from the light emitter. In some embodiments, the time at which these photons are detected may be used to provide, determine or calibrate a zero distance for time of flight distance measurements (as the distance between a target and the cover glass may substantially correspond to the distance between a target and the exterior of the time of flight sensor).

The one or more photodetectors preferably detect photons incident thereon and/or are preferably arranged to detect photons emitted by the emitter and reflected off one or more targets.

The one or more photodetectors comprised by the sensor are preferably a plurality of photodetectors, which may each separately and independently detect photons. For example, the one or more photodetectors may be an array of photodetectors.

In preferred embodiments, the plurality photodetectors may be used to obtain a plurality of distributions, each distribution being the distribution of times at which at least one photodetector of the plurality of photodetectors detected photons after each emission of the series of pulses of light. The method preferably further comprises, if any of the distributions comprise two or more separate peaks, recording one or more parameters of the earliest peaks of those distributions. Any optional feature of a distribution described herein may be considered to apply to one, some or all of the plurality of distributions.

The plurality of distributions preferably each being the distributions of times at which a different photodetector or group of associated photodetectors detected photons after each emission. In some embodiments the times at which each of the plurality of photodetectors comprised by the sensor are included in one of the plurality of distributions.

One, some or all of the plurality of distributions may be of times at which a single photodetector detected photons. Alternatively, or additionally, one, some or all of the plurality of distributions may be of times at which a group of associated photodetectors detected photons. The single photodetector, or group of associated photodetectors, may be the photodetectors of a pixel of an array. If the at least one photodetector is a plurality of photodetectors, the plurality of photodetectors may be physically grouped together, for example comprising a block of adjacent photodetectors within an array.

In some embodiments, whether photodetectors are grouped in this manner, or by which group or pixel they are comprised by may be reconfigurable, for example, to vary the number of photodetectors comprised by each group or pixel in order vary the resolution of the array of photodetectors and the number of photons detected by each group of associated photodetectors.

The sensor comprising a plurality of photodetectors and being used to obtain a plurality of distributions of times at which different single photodetectors or groups of associated photodetectors detected photons after each emission may allow the sensor to be or to act as a time of flight camera and/or to produce a range image with a plurality of pixels, each having an associated distance measurement derived from a different distribution of times at which one or more different photodetectors detected photons.

If at least one photodetector for which a distribution of times at which the at least one photodetector detected photons is a plurality or group of associated photodetectors, the distribution of times is preferably the distribution of times at which any of those photodetectors detected photons after each emission of the pulses of light.

The time of flight sensor may comprise one or more passive optical components which may be for focusing, and/or arranged to focus, incident light (such as light reflected off a target) onto the one or more photodetectors. For example, the time of flight sensor may comprise a lens arranged to focus incident light onto the one or more photodetectors. The one or more passive optical components may be intermediate the one or more photodetectors and the cover, or may be comprised by or formed integrally with the cover.

The time of flight sensor may comprise one or more optical filters which may be arranged to filter light incident upon the one or more photodetectors. For example, the time of flight sensor may comprise one or more optical filters intermediate the one or more photodetectors and the cover, or intermediate the one or more photodetectors and a passive optical component such as a lens.

The one or more photodetectors may be arranged adjacent and/or proximate to the light emitter, for example, within the same indent or cavity, or within adjacent indents or cavities, preferably beneath a shared cover as described above. The photodetectors are preferably arranged to detect light emitted by the light emitter and reflected from a target; for example, the photodetectors may comprise detecting elements or surfaces facing in the same direction as the light emitter.

The time of flight sensor is preferably a direct time of flight sensor, which may measure the time between the emission of a pulse of light and the subsequent receipt of a photon (in one of the measurement steps) directly, for example, by synchronising the emitter and the one or more photodetectors. The sensor may comprise driving electronics which may provide high speed signals for controlling and synchronising the emitter and the one or more photodetectors.

Alternatively, the time of flight sensor may be an indirect time of fight sensor. The emitted pulses of light may be modulated and the photodetectors may detect light pulses incident thereon and detect the phase difference between the detected waveforms and the emitted waveform of a pulse of light. For example, the waveform of light detected by a photodetector may be correlated with a photodetector waveform (for example, which modulates the gain of the photodetector). This may produce a correlation waveform, which may be sampled to calculate a phase difference between emitted and detected waveforms. This phase delay may correspond to and may be converted into a distance or time of travel.

The method comprises emitting a series of pulses of light from the light emitter.

The pulses of light are preferably of equal or substantially equal duration (for example, lasting 500 picoseconds), and the time gaps between successive pulses of light are preferably of substantially equal duration. For example, each pulse of light may be emitted at the same point in time in or relative to one of a series of detection periods, each of equal duration.

The emitted pulses of light are preferably of a fixed wavelength, and the light emitter is preferably a laser, such as a semiconductor laser diode. In some embodiments the light emitter may be a vertical-cavity surface-emitting laser (VCSEL). In embodiments where the light emitter only emits light at a specific wavelength, the photodetectors may only detect incident photons at or around that wavelength, this may minimise the number of background photons detected by the photodetectors that did not originate from the light emitter.

The series of light pulses may comprise more than 50,000 light pulses, or more than 75,000 light pulses, more than 100,000 light pulses, more than 250,000 light pulses, more than 500,000 light pulses, or more than 750,000 light pulses.

The number of light pulses in the series may be variable. For example, the sensor may be operable in one or more low power and/or short measurement duration modes, with comparatively low numbers of light pulses and may be operable in modes with comparatively high numbers of light pulses to ensure significant peaks are obtained in the one or more distributions. For example, the method may be performed with series with any of a plurality of numbers of pulses of light between 80,000 and 800,000 light pulses.

Emitting a series of light pulses and using the one or more photodetectors to detect photons after each emission allows each of the one or more photodetectors to detect a large number of photons and one or more distributions of the times at which at least one photodetector detected photons after each of the series of emissions to be obtained.

Repetition of the measurement steps may be necessary because the photodetectors may be unable to detect a second photon for a window of time after detecting a first photon, therefore the number of photons each photodetector may detect during a single measurement step may be limited, potentially resulting in an inaccurate distribution.

The method further comprises using the one or more photodetectors to obtain a distribution of times at which at least one photodetector of the one or more photodetectors detected photons after each emission of the series of pulses of light.

One, some or all of the one or more photodetectors may be photodiodes or other sensors for detecting photons incident thereon. One, some or all of the photodetectors may be single photon avalanche diodes (SPADs) which may produce a large short duration avalanche current upon detection of a photon. In preferred embodiments each of the one or more photodetectors is a single photon avalanche diode (SPAD).

The times comprised by the, or each distribution at which at least one photodetector (such as a single photodetector, or group of associated photodetectors as described above) detected photons may include times during and/or before each emission of the series of light pulses, in addition to times after.

For example, the, or each distribution of times is preferably a distribution of times at which at least one photodetector (such as a single photodetector, or group of associated photodetectors as described above) detected photons before, during and after each emission of pulses of light.

Including the times at which the at least one photodetector detected photons during and/or before each emission of a pulse of light in the distribution obtained for the at least one photodetector may advantageously allow a background or noise level of photon detection (such as a background or noise frequency of photon detections per unit time) excluding reflected emitted photons to be more accurately determined. This may facilitate the detection of photons reflected off targets or other structures, for example by contributing to the determination of a detection threshold.

The times at which at least one photodetector detected photons—which are comprised by the, or each distribution—may be relative to one of the emissions of the series of pulses of light and/or relative to a detection period in which the photons were detected. In preferred embodiments the times at which the at least one photodetector detected photons are relative to an emission of one of the series of pulses of light during or immediately preceding a detection period in which the photon was detected.

Performing the method may comprise a plurality of such detection periods, preferably one such detection period for each emission of a light pulse of the series. Each detection period preferably beginning before, during, and/or immediately after one emission of the series (with which the detection period may be considered to be associated), and preferably ends before a subsequent emission of the series.

The plurality of detection periods are preferably of equal duration. This duration of the detection period is preferably equal to, substantially equal to, or less than the sum of the duration of one of the light pulses and the duration of one of the time gaps between emissions light pulses of the series.

Each emission of a pulse of light is preferably at the same time within and/or with respect to the detection period with which that emission is associated.

The detection period may begin less than 5000 picoseconds before, less than 2500 picoseconds before, more than 500 picoseconds before and/or more than 1000 picoseconds before the emission of a pulse of light with which the detection period is associated. The detection period may begin more than 5000 picoseconds after, more than 10,000 picoseconds after, more than 20,000 picoseconds after, more than 30,000 picoseconds after, and/or less than 50,000 picoseconds after the emission of a pulse of light with which the detection period is associated.

In some embodiments, there may be no gaps in time between successive or consecutive detection periods Alternatively, there may be time gaps between successive or consecutive detection periods, these time gaps may be of equal duration.

The duration of a portion of a detection period of the measurement steps following the emission of a pulse of light may correspond to a maximum range at which the time of flight sensor may detect a target when performing the method. For example, in an embodiment wherein the detection period lasts 35000 picoseconds, with a pulse of light being emitted 2000 picoseconds after the beginning of the detection period, the maximum time of flight of a reflected photon which may be detected is 33000 picoseconds, corresponding to a round trip travel distance of 9.89 metres (to 3 significant figures) and to a sensor range of 4.95 metres (to 3 s.f.). Alternatively, the maximum range of the sensor may be less than that calculated from the detection periods; for example, the sensor may only detect and/or measure distances targets up to a maximum time within the distribution.

The times of the, or each distribution at which at least one photodetector detected photons, are preferably the times in and with respect to the detection period in which that photon was detected.

The distribution therefore preferably comprises a plurality of times at which photons were detected, each relative to detection period in which that photon was detected. In preferred embodiments in which the detections periods are of equal duration, this will be a plurality of times within a range equal to the duration of the detection periods.

In some embodiments, each of the detection periods may be divided into a series of time intervals. In preferred such embodiments, each of the detection periods is divided into an identical series of time intervals. The time intervals of the series may be relative to the emission immediately preceding, during, or otherwise associated with the detection period.

In such embodiments, the time at which a photodetector detects a photon may be which of the plurality of time intervals the photon was detected during. The, or each, distribution may comprise counts of the total number of photons detected by the at least one photodetector during all of the time intervals at a given time (spanning a given range of times) with respect to the emission during, immediately preceding, or otherwise associated with the detection period (comprising the time interval) comprising that time interval and/or in which the/that photon was detected.

The distribution preferably comprises counts of the total number of photons detected by the at least one photodetector during all instances of each time intervals of the identical series of time intervals into which each of the detection periods is divided.

The, or each, distribution of times may be obtained by counting the number of photons detected by the at least one photodetector during each of the plurality of the recurring time intervals of the detection period.

A counted number of photons detected by the one or more photodetectors during all of the time intervals at each of the plurality of times may be or may contribute to values of the distribution for time intervals at the plurality of times.

A counted number of photons detected by the at least one photodetectors during a time interval of the plurality of time intervals may be or may contribute to a value of the distribution for the time interval of the plurality of time intervals. This time interval may be a bin of the distribution.

Repeated time intervals of the identical series of time intervals into which the detection periods are identically divided may correspond to bins of the distribution obtained for the, or each, at least one photodetector. The or each distribution may comprise a plurality of bins with counts, the count of each being the total number of photons detected by the at least one photodetector during all of the time intervals at each of a plurality of times with respect to light pulse emission of the measurement steps in which they occur, over the course of the series.

Each of the time intervals of each of the detection periods may have an equal or substantially equal duration. In such embodiments, the ratio of frequencies of photon detections between different time intervals will be proportional to the ratio of the number of photon detections counted during those time intervals.

Each time interval may be greater than 50 picoseconds, greater than 70 picoseconds, or greater than 90 picoseconds. Each time interval may be less than 200 picoseconds, less than 150 picoseconds, less than 125 picoseconds, or less than 110 picoseconds. In some embodiments the time intervals may be 100 picoseconds.

For example, each detection period may consist of 350 consecutive time intervals, each of 100 picoseconds. A pulse of light being emitted 2000 picoseconds after the beginning of the detection period results in a sensor range of 4.95 metres (to 3 s.f.) as described above.

The, or each distribution may comprise counts of the numbers of photons detected by the at least one photodetector at a plurality of different times or within a plurality of different time intervals, with respect to each emission of the series. The, or each distribution may therefore be a frequency distribution.

The plurality of time intervals may be relative to the emission of a pulse of light during, immediately preceding, or otherwise associated with the detection period in which the photons were detected. The plurality of time intervals may be bins of the distribution.

For example, the distribution may be or may comprise counts of the total number of photons detected by the at least one photodetector in all repetitions of each of a series of identical time intervals which were repeated with each detection period and light pulse emission associated therewith.

The frequency of photon detections in each of the time intervals may be the count of that time interval divided by the duration of the time interval. The frequency of each time interval of the frequency distribution being proportional to the probability of a photon being detected by that photodetector in that time interval. In embodiments wherein the time intervals are of equal duration, the frequencies of the time intervals are proportional to the counts of the time intervals.

In some embodiments the distribution may be or may comprise a graphical representation of the measured times. In preferred such embodiments, the distribution may be a histogram. The histogram may comprise bins with counts corresponding to time intervals (such as time intervals relative to the detection period that the counted photons were detected in and/or to the emission associated therewith) and the number or photons detected therein respectively.

The counts of numbers of photons detected during time intervals and/or bins may be stored in one or more memory or hardware locations. For example, the count of each bin and/or time interval of each at least one photodetector's distribution may be stored in a separate memory location. When a photodetector detects a photon, it may increment a count in a memory or hardware location (for example by producing an avalanche current thereto in embodiments wherein the photodetector is a SPAD). Which of a plurality of memory or hardware locations the count is incremented in may be determined by a high speed signal from driving electronics which may be comprised by the sensor, each memory or hardware location may correspond to a specific repeated time interval.

In embodiments wherein the distribution comprises only counts of the number of photons detected by that photodetector in each of a plurality of time intervals, the distribution may be obtained by the process of counting these numbers, and may be embodied by storing the numbers in one or more memory or hardware locations. In embodiments wherein the distribution is or comprises a graphical representation of the measured times, such as a histogram, the graphical representation may be obtained by being generated or plotted by a processor.

The method comprises, if the, or each, distribution comprises two or more separate peaks, recording one or more parameters of the earliest peak of the distribution.

In embodiments where the distribution is or comprises a graphical representation, such as a histogram, the peaks may be peaks thereof.

Alternatively, or additionally, peaks may be parts (such as one or more consecutive time intervals) of the distribution which are above a predetermined threshold. For example, above a threshold frequency (a threshold number of photon detections per unit time), which may be a threshold count of photon detections per bin or time interval of the distribution. In some embodiments, peaks may be parts of the distribution which include a local maximum frequency (and or a local maximum count per time interval or bin) and are above the predetermined threshold frequency.

Such a threshold frequency may be dependent on background or noise frequency of the distribution, on the number of pulses of light comprised by the series, upon the local maximum frequency of the part of the distribution, upon the average frequency of the distribution, upon the absolute maximum frequency of the distribution and/or upon other statistical measures, such as the standard deviation from an average frequency.

In some embodiments, the threshold frequency or count for a peak to be detected may be a function of the time in the distribution. For example, the threshold may be higher at earlier times which may be closer to the expected peak due to reflections off the cover.

For example, in some embodiments, a peak may be or may comprise any time interval whose frequency is a local maximum and above a threshold frequency and any time intervals contiguous thereto with frequencies above that threshold frequency or a different threshold frequency.

In some embodiments, each peak may comprise a time interval with a local maximum of the distribution and any contiguous time intervals therewith above a threshold.

For example, a peak may be any time interval with a frequency which is a local maximum and which is at least six standard deviations of the distribution above a noise frequency baseline, as well as any time intervals contiguous thereto with frequencies at least half that of the local maximum frequency of the peak, or at least double a background or noise frequency of the distribution.

An average background or noise frequency or count may be determined by averaging the frequencies or counts of time intervals which are not comprised by a peak, or by averaging the frequencies or counts of time intervals before the emission of a light pulse. For example, in an embodiment of the method wherein each detection period is divided into an identical series of time intervals which repeat with each measurement step, and a pulse of light is emitted at the same point in each detection period, the average background or noise detection frequency of a frequency distribution may be determined by averaging the frequencies of the repeated time intervals before the light pulse emission.

Two peaks may be determined to be separate if the distribution comprises a predetermined length of time, or a predetermined number of bins or time intervals intermediate the two peaks (for example, intermediate bins comprised by the two peaks, or intermediate the times at which the maxima of the two peaks occur), which are not comprised by a peak and/or are below a maximum frequency (which may be dependent upon a background or noise frequency, upon the local maximum and/or threshold frequencies of one or both of the two peaks, upon on the number of pulses of light comprised by the series, upon the average frequency of the distribution, upon the absolute maximum frequency of the distribution, upon other statistical measures such as the standard deviation from the mean frequency and/or upon the actual or minimum number of separating time intervals).

For example, two peaks may be separate if the frequency distribution comprises one or more time intervals with frequencies less than a set multiple of standard deviations (such as 2.5 standard deviations) above the average background or noise frequency are between the two peaks.

In some embodiments, peaks may be determined to be separate if they are separated by at least a predetermined length of time. In further embodiments two peaks may be determined to be separate if the earliest peak is within a predetermined cover reflection peak window and the later peak is separated from the earlier peak by at least a predetermined length of time. The predetermined length of time may be predetermined number of bins or time intervals of the distribution, such as 1.5 bins.

In alternative embodiments, two peaks may be determined to be separate if the distribution comprises a portion (such as one or more time intervals) between the peaks which is not comprised by a peaks and/or is at, around, or below a threshold or noise level. Alternatively, or additionally, two peaks may be separate if they do not overlap or interfere with each other.

In some embodiments, the distribution may comprise two separate peaks if (and one or more parameters of the earliest peak may be recorded if) the distribution comprises two or more peaks and the second earliest peak is after a threshold time. The second earliest peak may be after the threshold time if its maximum is after the threshold time, or if any portion of the peak is after the threshold time. The threshold time is preferably a time before which a peak will overlap, interfere and/or not be separate from a peak due to reflections off the cover or material thereon.

In some embodiments, the threshold time may be dependent upon one or more recorded parameters of the earliest peak of one or more previous measurements, such as the time at which the earliest peak occurred in a previous measurement. Alternatively, or additionally, the threshold time may be dependent upon the time at which the earliest peak of the frequency distribution is located.

In some embodiments, the method may comprise the additional step of, if the distribution, or one of the plurality of distributions, comprise(s) two or more separate peaks, determining the separation in time between the earliest peak and at least one of the one or more other peaks. The separation in time between the earliest peak and the second earlies peak, the largest of the later peaks, or each of the later peaks may be determined. The separation between peaks may be measured between the maxima of the peaks.

The separation in time may be divided by twice the speed of light to determine a distance between the cover of the sensor and the target whose reflections produced the peak to which the separation was measured. Whether the frequency distribution comprises two or more separate peaks may be determined by a processing means, which may be comprised by, or be in communication with the time of flight sensor.

If the, or each, distribution comprises two or more separate peaks, one or more parameters of the earliest peak, which as described above may be assumed to be a peak due to reflections off the cover, are recorded.

The one or more recorded parameters may be or may comprise the time in the distribution at which the peak occurs, the area of the peak, the height of the peak, the width in time of the peak, the full width of the peak at half its maximum height, and/or the shape of the peak.

In embodiments wherein the distribution is a frequency distribution, the one or more parameters may be or may comprise the maximum frequency of the peak, an average frequency of the peak, the width in time of the peak, the full width of the peak at half its maximum frequency, the shape of the peak, which time intervals the peak is defined by or located in, and/or the frequency of one, some or all of the time intervals.

Any recorded frequencies may be normalised with respect to the total or average frequency of the frequency distribution (this may allow them to be compared parameters recorded in other measurements in which more or less light was received by the photodetector, or in which different numbers of light pulses were emitted).

In some embodiments, the recorded parameters may overwrite previously stored parameters of a cover reflection peak in sensor or a memory in communication therewith, such previously stored parameters may have been parameters recorded by a previous performance of, or measurement according to, the method or may have been factory calibration values. Alternatively, the recorded parameters may be stored in addition to previously stored parameters.

In some embodiments, one or more parameters of the earliest peak may only be recorded if the earliest peak (or the maximum frequency value thereof) is before a maximum threshold time and/or if the second earliest peak (or the maximum frequency value thereof) is after a minimum threshold time. These threshold times may be dependent upon the distance between the cover and the one or more photodetectors and the light emitter, or may be dependent upon previously stored parameters as described above.

These requirements may ensure that the earliest peak is due to reflections off the cover or material thereon.

Alternatively, or additionally, the one or more parameters may only be recorded if they fall within a predetermined expected range for those parameters, this may prevent erroneous results being recorded.

In some embodiments the resolution of the time of flight sensor and of measurements made in the distributions produced by the method (for example the times at which peaks are located, the distances between peaks, and/or the height or magnitude of the peaks) may be enhanced using data processing techniques, such as quadratic interpolation. These techniques may, for example, use the magnitude or intensity of a bin with a local maximum count or frequency and of one or more proximate or adjacent bins to more accurately determine the distance to that peak. This may allow the times at which peaks occur, or the separation between peaks to be measured to a greater resolution than the width of the bins comprised by the distribution.

For example, if a peak comprises a plurality of bins equally spaced in time, with a bin with a maximum count, preceded by a bin with a bin with half the maximum count and followed by a bin with three quarters of the maximum count. The true maximum of the peak may be estimated to be intermediate the centres of the bin with the maximum count and the following bin with three-quarters of the maximum count. The true maximum count frequency of the peak may also be estimated to be above the count frequency of the bin with the maximum count. Estimated true maximums of peaks may be determined by fitting curves such as parabolas to points defined by the counts of the bins comprised by the peak.

In features of the method described above, wherein parameters of one or more peaks, such as the time at which a maximum of the peak occurs or the maximum frequency of a peak may be parameters of a peak curve fitted to the counts or frequencies of a plurality of bins instead of parameters of the counts or frequencies of the bins themselves.

In some embodiments, the light emitter may form part of, and/or may be comprised by an optical stack. In such embodiments, the method may measuring the level of optical cross talk due to reflections off the cover and/or may calibrate the time of flight sensor in conjunction with the optical stack.

According to another embodiment there is provided a time of flight sensor configured to perform the method described above.

The time of flight sensor may comprise any of the optional features described above with reference to the sensor performing the method, and/or may be configured to perform any optional feature of the method described above.

According to another embodiment there is provided a device comprising one or more of the above-described sensors.

For example, a mobile communications device such as a smartphone comprising one or more of the above-described sensors.

According to another embodiment there is provide a non-transitory storage medium comprising computer instructions executable by one or more processors comprised by or in communication with a time of flight sensor comprising a light emitter and one or more photodetectors, the computer instructions when executed by the one or more processors causing the time of flight sensor to perform a method as described above.

The computer instructions when executed by the one or more processors may cause the time of flight sensor to perform any optional features of the method described above.

Embodiments will now be described by way of example with reference to the figures.

DETAILED DESCRIPTION

Figure 1A:
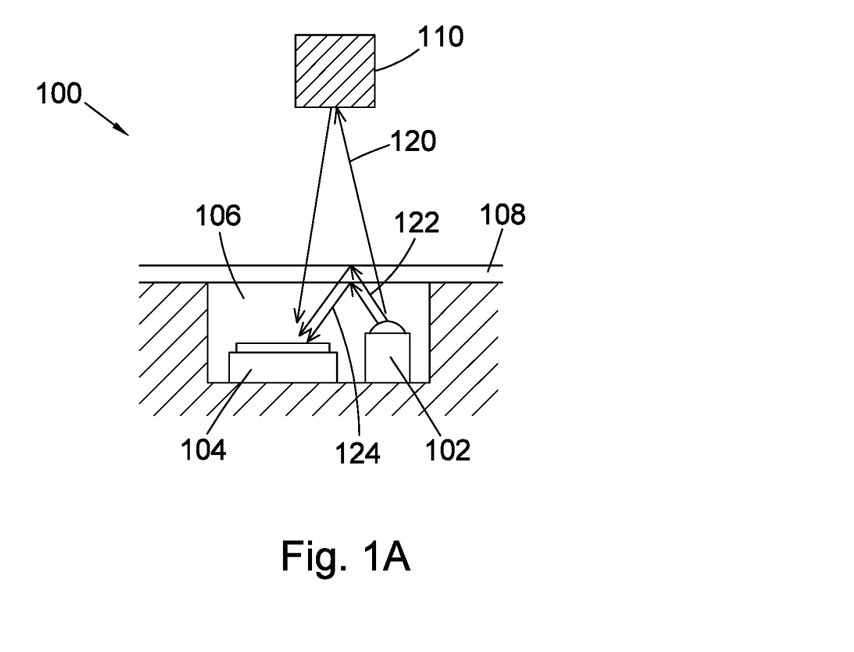
FIG. 1A is a sectional view of a time of flight sensor in which a light emitter and photodetector array are located in a shared cavity beneath a cover.
Figure 1B:
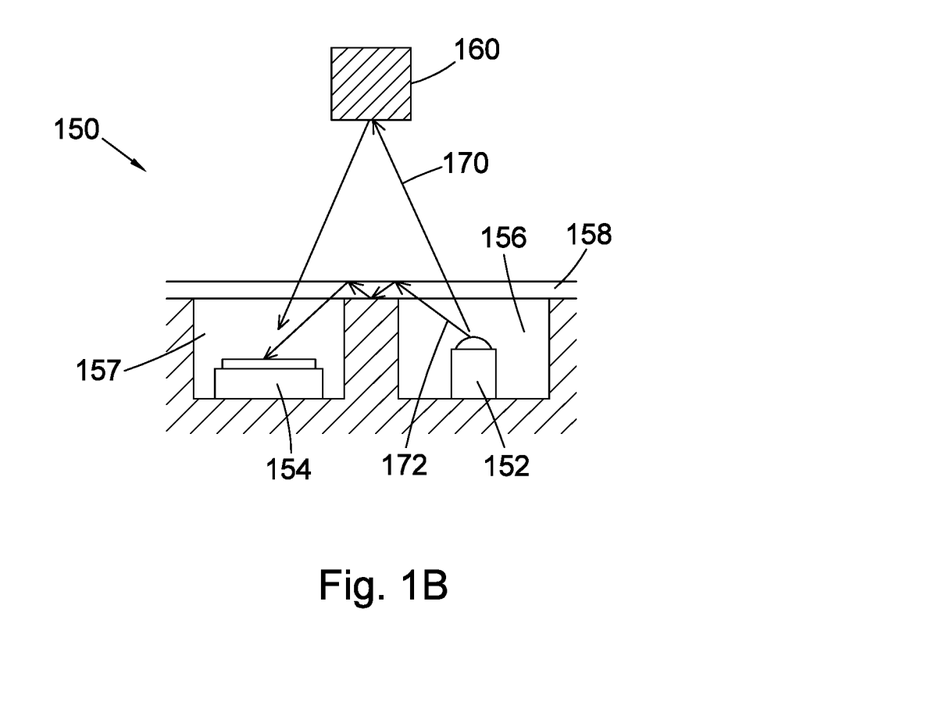
FIG. 1B is a sectional view of a time of flight sensor in which a light emitter and photodetector array are located in separate cavities beneath a shared cover.

FIGS. 1A and 1B show respective sectional views of the optical components of two embodiments of time of flight sensors 100, 150. Each of the sensors 100, 150 comprises a light emitter 102, 152 for emitting pulses of light, a photodetector array 104, 154 arranged to detect the reflections of the pulses of light, and a transparent cover 108, 158 arranged to cover the light emitter 102, 152 and the photodetector array 104, 154.

The light emitters 102, 152 and the photodetector arrays 104, 154 are located in cavities 106, 156, 157 underneath the covers 108, 158. In the first time of flight sensor 100, the light emitter 102 and the photodetector array 104 are both arranged within a shared cavity 106. In the second time of flight sensor 150, the light emitter 152 is located within a first cavity 156 and the photodetector 154 is located within a second separate cavity 157.

In one embodiment both of the two cavities 156, 157 of the second sensor 150 are covered by the same cover 158, although it is envisaged that, in another embodiment two separate covers may be used to respectively cover the two cavities 156 and 157.

In some time of flight sensors, the cavities 106, 156, 157 may be defined by apertures through a spacer wafer or spacer member arranged between the cover 108, 158 and a substrate on which the light emitter 102, 152 and photodetector array 104, 154 are mounted.

In use, pulses of light are emitted by the light emitters 102, 152 and the photodetector arrays 104, 154 detect photons incident thereon. The times at which photodetectors of the photodetector arrays 104, 154 detect photons are measured relative to the times at which the light emitters 102, 152 emitted pulses of light, in order to determine the travel time of photons emitted by the light emitters 102, 152 and reflected off targets 110, 160 onto the photodetector arrays 104, 154. These measured times allow the distance between the sensors 100, 150 and the targets 110, 160 to be determined.

However, in addition to light 120, 170 which is emitted by the light emitters 102, 152 and reflected off targets 110, 160, the photodetector arrays 104, 154 also detect light from other sources which may be referred to as optical crosstalk. Optical crosstalk includes light which is not emitted by the light emitters 102, 152, as well as light 122, 124, 172 which is emitted by the light emitters 102, 152 and reflected off the covers 108, 158.

In the first sensor 100, light 124 is reflected off the exterior of the surface of the cover 108 adjacent to the cavity 106 and light 122 is totally internally reflected of the interior of the surface of the cover 108 distal from the cavity 106. In the second sensor 150, as the light emitter 152 and photodetector array 154 are located in separate cavities 156, 157, light reflected off the exterior of the surface of the cover 158 will not reach the photodetector array 154. Light 172 totally internally reflected of the interior of the surfaces of the cover 158 travel from the first cavity 156 to the second cavity 157 and thereby from the light emitter 152 to the photodetector array 154. Light may also be reflected off material, such as dirt or other contaminants, on the cover.

Light 122, 124, 172 which is reflected off the cover or material thereon travel shorter distances than light 120, 170 reflected off targets 110, and therefore will be detected at earlier times after the emission of a pulse of light by the light emitter 102, 152.

Figure 2:
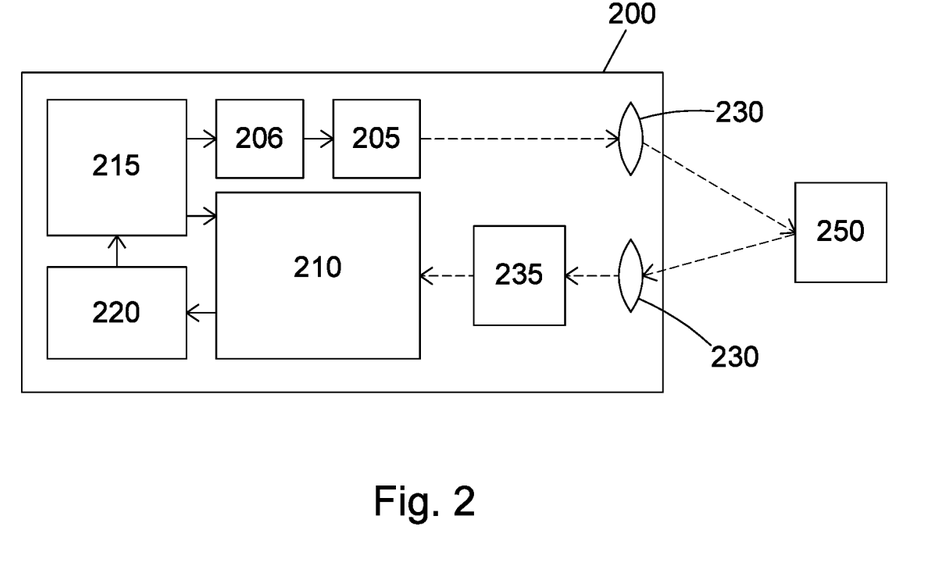
FIG. 2 is a diagrammatic view of a time of flight sensor.

FIG. 2 shows a diagrammatic view of a time of flight sensor 200. The sensor 200 comprises a vertical cavity surface emitting laser (VCSEL) 205 for emitting a series of light pulses, a driver 206 for driving the VCSEL 205, a detection module 210 for detecting photons and counting the number of photons detected in each of a plurality of consecutive time intervals which recur with each light pulse emission, a control module 215 for controlling the driver 206 and the detection module 210, a data processing module 220, an optical filter 225 and a pair of passive optical elements 230.

The detection module 210 comprises an array of single photon avalanche diodes (SPADs), one or more time to digital converters (TDCs) and a memory. SPADs are solid state photodetectors which produce a short avalanche current when they detect a photon. The one or more TDCs measure the time between initial signals from the control module (which are at fixed times relative to the emission of light pulses) and signals created the SPADs when they detect a photon. The memory records the times at which photons are detected by the SPADs.

The memory may comprise one or more sets of counters, each set of counters being associated with single SPAD or a group of SPADS (which may be arranged together and may together define or act as a pixel of the array of the detection module). Each counter of a set corresponds to one of a plurality of consecutive time intervals into which a recurring detection period is divided. The detection period, and time intervals thereof, repeat with each light pulse emission of the series of light pulse emissions.

When a SPAD detects a photon, the time within the detection period (and consequently which of the plurality of time intervals) the photon was detected in is determined by the TDC. The counter corresponding to that time interval and associated with that SPAD is then incremented by one. Which of the counters is incremented may be controlled by a shift register.

Each set of counters may therefore obtain counts of the number of photons detected by a SPAD, or by a group of associated SPADs, in each of a plurality of time intervals relative to the emission of a pulse of light in the detection period in which the photons were detected. The relative counts of each time interval corresponding to the relative probabilities of a photon being detected in each of those time intervals when a light pulse is emitted. The counts are a distribution which may be converted into, or visualised as, a histogram; for example, by the data processing module 220.

The control module 215, which may comprise driving electronics, provides high speed signals to the driver 206 and the detection module 210. The signals synchronize the emission of the series of pulses of light and the repeating detection period of the detection module, such that one pulse of light is emitted at the same point in time relative to (and preferably within) each repetition of the detection period.

The data processing module 220 receives data from the detection module. The data may be, or may be derived from, the counted number of photons detected in each of the time intervals by each of the SPADs or groups thereof. The data processing module may determine if the distribution of times at which photons were detected by a SPAD, or group of associated SPADS, over the series of emissions comprises peaks; may determine whether two or more of those peaks are separate, and if so, the separation between the peaks. This may be used to determine the distance to a target 250.

The passive optical elements 230 are lens elements. One of the passive optical elements 230 is arranged over the VCSEL 205 and the other is arranged over the detection module 210 and is arranged to focus incident light thereon such that a range image may be produced by the SPAD array. The optical filter 235 is arranged between the detection module and the lens element over the detection module. The lens elements may be comprised by a cover over the VCSEL 205 and the SPAD array.

Figure 3:
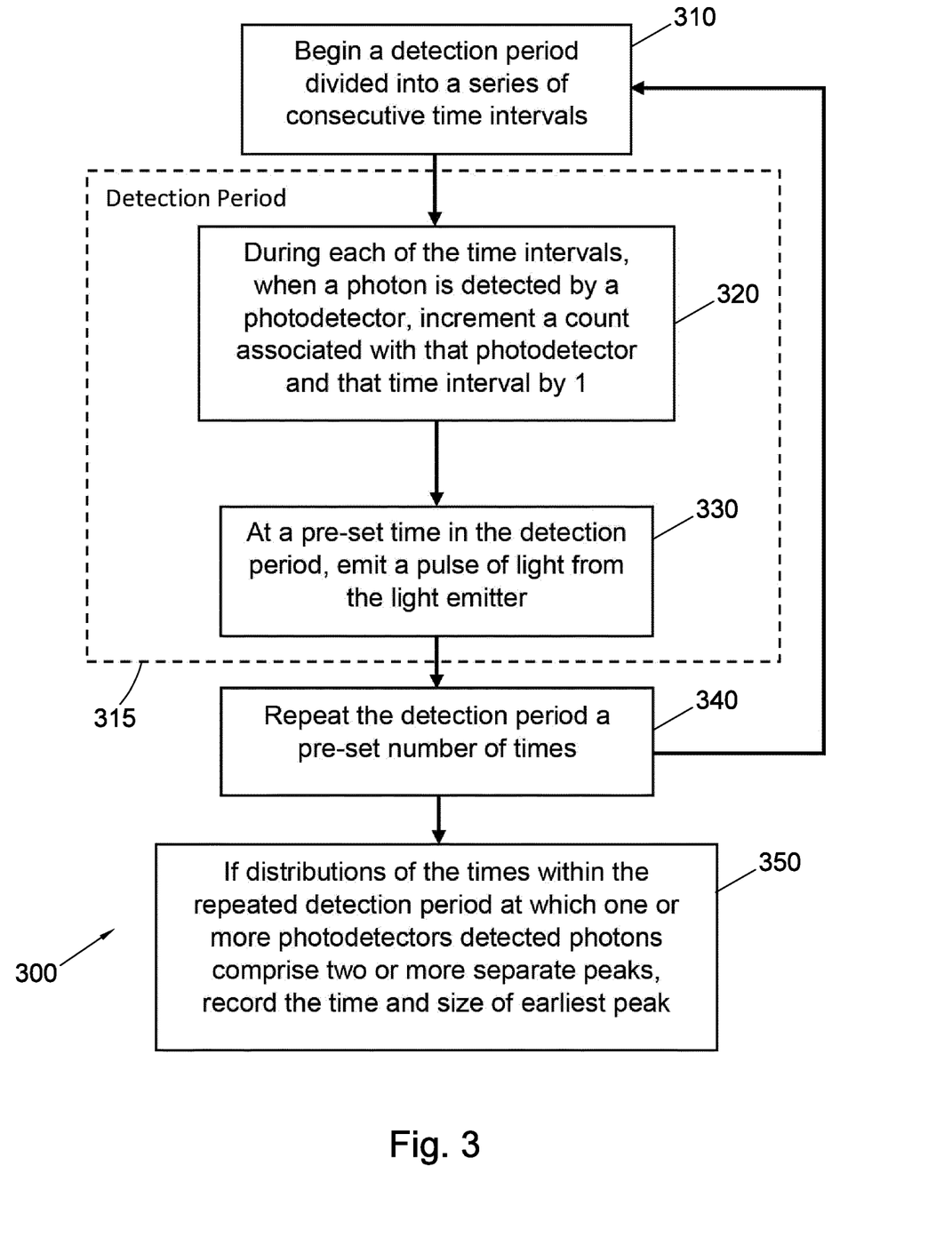
FIG. 3 is a flow chart of a method for measuring optical crosstalk in a time of flight sensor.

The sensor 200 may operate under computer instructions which may be stored on one or more non transitory storage media which may be comprised by the control module 215, the data processing module 220, the detection module 210, and/or an external computing device in communication with the sensor, and/or modules thereof. The computer instructions may be executed by one or more data processors comprised the control module 215, the data processing module 220, the detection module 210, and/or an external computing device in communication with the sensor, and/or modules thereof, in order to use the sensor 200 to perform a method 300 for measuring optical crosstalk due to reflections of light pulses off the cover of the sensor 200.

FIG. 3 is a flow diagram of a method 300 for measuring optical crosstalk due to reflections of light pulses off the cover of a time of flight sensor comprising a light emitter (such as a VCSEL) and one or more photodetectors (such as a SPAD array).

The method comprises emitting a series of light pulses, obtaining one or more distributions of the times at which the one or more photodetectors detect photons, and if any of the distributions comprise two or more separate peaks, recording one or more parameters of the earliest peak. The times at which the one or more photodetectors detect photons being times at which photons were detected within and relative to a recurring detection period 315 which recurs with each emission 330 of a light pulse.

In a first step 310 of the method 300, a detection period 315 is begun. The detection period is divided into a series of consecutive time intervals in which photons may be detected by the one or more photodetectors. The number and duration of the time intervals is pre-set, and the time intervals are preferably of equal duration. For example, the detection period may comprise three hundred and fifty time intervals, each time interval lasting one hundred picoseconds; the detection period therefore lasts thirty-five nanoseconds in total.

During the detection period 315, in a second step 320, if any of the one or more photodetectors detects a photon during any of the time intervals, a count of photons detected in that time interval by that photodetector, or by a group of associated photodetectors comprising that photodetector, is incremented by one.

At a pre-set point in time during the detection period 315, in a third step 330, a pulse of light is emitted from the light emitter. The pulse of light may be emitted after a pre-set number of time intervals and preferably has a fixed duration. For example, the light pulse may last five hundred picoseconds and may be emitted beginning immediately after the twentieth time interval.

In a fourth step 340, the detection period 315 is repeated a predetermined number of times. During each repetition, one light pulse is emitted (at the same point during each repetition of the detection period 315). Each of the time intervals of the detection period 315 is repeated and if a photodetector detects any photons therein, the count of photons detected by that photodetector in that time interval is incremented. The number of repetitions of the detection period may be between 80,000 and 800,000 inclusive; for example, with lower numbers of repetitions being in a low power mode of the sensor, and/or for use with targets with greater reflectivity.

Figure 4A:
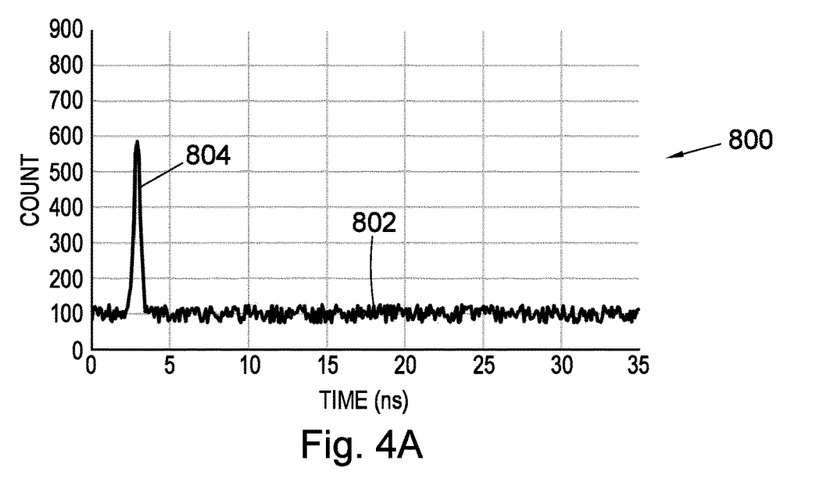
FIG. 4A is a histogram obtained by a time of flight sensor with no target present.
Figure 4B:
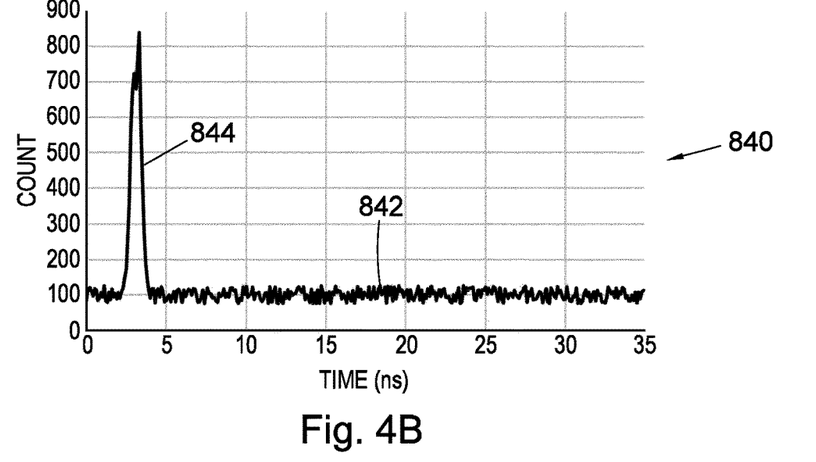
FIG. 4B is a histogram obtained by a time of flight sensor with a target close to the cover.
Figure 4C:
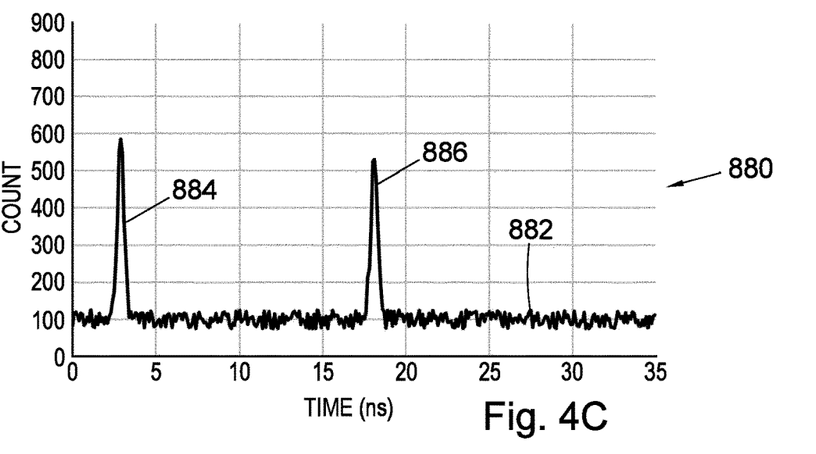
FIG. 4C is a histogram obtained by a time of flight sensor with a target distant from the cover.

A distribution is therefore obtained for each of the photodetectors, or groups of associated photodetectors, of the number of photons detected by that photodetector, or group of photodetectors, in each of the time intervals. The distribution comprising counts for each of the time intervals of the number of photons detected by that photodetector over all repetitions of the detection period 315. The distribution may be, or may be visualised as, a histogram. Examples of such distributions 300, 440, 480 are shown in FIGS. 4A to 4C.

In a fifth step, 350, if any of the obtained distributions comprises two or more separate peaks, the time and size of the earliest peak is recorded. Peaks may be identified as groups of consecutive time intervals in which the number of counted photons exceeds a threshold value, which may be dependent upon the background or noise count level in the distribution. The background or noise count level of a distribution may be determined by averaging the counts per time interval of time intervals before a pre-set time, for example of time intervals before the emission of a light pulse during the detection period.

In some embodiments of the method, parameters of the earliest peak may only be recorded if the distribution comprises two or more separate peaks and the earliest peak is at a time where a peak due to reflections off a cover glass would be expected (for example at or close to the time at which a factory calibration measurement recorded reflections off the cover).

Two or more peaks may be considered to be separate if they are separated by a minimum number of time intervals which are not comprised by any peaks. For example, if they are separated by one or more time intervals which are not comprised a peak (such as time intervals which have counts below a threshold value as described above).

The time at which the earliest peak is located is recorded, for example, by recording which time intervals are part of the peak. The size of the peak in counts is also recorded, for example, by subtracting an average noise or background count from the count of each time interval comprised by the peaks and summing the total counts remaining in the peak thereafter.

FIGS. 4A, 4B, and 4C show example histograms 400, 440, 480 of the times at which a photodetector (or a group of associated photodetectors) detected photons over the course of a series of light pulse emissions and detection periods repeated therewith.

Each histogram 400, 440, 480 comprises three hundred and fifty bins, each corresponding to a one hundred picosecond time interval of the repeated detection period, and counts of the total number of photons detected by the photodetector (or group of associated photodetectors) during each of the time periods. The histograms 400, 440, 480 being obtained by performing a number of iterations of the detection period 315 of the method 300 described above.

A first histogram 400, shown in FIG. 4A, is obtained by performing the repetitions of the detection period 315 of the method 300 when no target was present within the range and field of view of the photodetector (or group of associated photodetectors). The histogram comprises a background noise level 402 of approximately one hundred counts per bin and a single peak 404 with a maximum count of approximately five hundred and ninety detections in the time interval 2.8-2.9 nanoseconds into the repeated detection period. The peak 404 has a full width at half maximum of approximately 7 time intervals between approximately 2.5 and 3.2 nanoseconds into the repeated detection period. This peak 404 is caused by reflections of light emitted in the light pulses off the cover of the sensor, or material thereon.

However, the histogram 400 does not comprise multiple separate peaks and therefore no measurement of the optical crosstalk is taken. This is because where a histogram comprises only a single peak, it is difficult to determine from such histograms alone, whether the peak contains only optical crosstalk or whether it also includes reflections off a target close to the cover.

A second histogram 440 obtained by performing the repetitions of the detection period 315 with a target present close to the cover is shown in FIG. 4B. This histogram 440 also comprises a background noise level 442 of approximately one hundred counts per bin and a single peak 444. The single peak 444 includes counts of photons reflected off the cover and photons reflected off the close target. The peak 444 has a maximum count of approximately eight hundred and forty detections within the time interval 3.2-3.3 nanoseconds into the detection period and has a full width at half maximum of approximately 9 time intervals between approximately 2.6 and 3.5 nanoseconds into the detection period.

FIG. 4C shows a third histogram 480 obtained by performing the repetitions of the detection period 315 with a target present at a distance from the cover. The histogram 480 comprises a background noise level 482 of approximately one hundred counts per bin and two peaks 484, 486.

The earliest peak 484 has a maximum count of approximately five hundred and ninety detections within the time interval of 2.9-3.0 nanoseconds into the detection period, and a full width at half maximum of approximately 6 time intervals between approximately 2.5 and 3.2 nanoseconds into the repeated detection period.

The later peak 486 is has a maximum count of approximately five hundred and thirty counted detections within the time interval of 18.0-18.1 nanoseconds into the detection period, with a full width at half maximum of approximately 7 time intervals between 17.7 and 18.4 nanoseconds into the repeated detection period.

As the distribution contains two separate peaks 484, 486 and because the earliest peak 484 is at a time corresponding to an expected travel time for light reflected off the cover, the earliest peak 484 can be assumed to contain only counts of noise and photons reflected off the cover. The earliest peak 484 can be assumed not to contain reflections off a target close to the cover, as such a target would block photons from a more distant target and prevent the appearance of the later peak 486.

When a histogram 480 with two separate peaks 484, 486 is obtained for a photodetector (or group of associated photodetectors) when performing the method 300. One or more parameters of the earliest peak 484 (the peak due to reflections off the cover glass) is recorded.

The parameters preferably include the time at which the earliest peak occurred (for example, the time interval in which the peaks maximum occurred, or which time intervals had counts above a threshold number) and the total number of counts of the peak (for example the total number of counts of all time intervals comprised by the peak, which may be all time intervals with counts above a threshold number). The total number of counts is proportional to the total energy of detected reflections off the cover glass. When recording the total number of counts of the earliest peak, an average background or noise count may be subtracted from the count of each time interval such that the measurement of optical crosstalk due to reflections off the cover is independent of optical crosstalk due to ambient light in the environment in which the measurement was taken.

Threshold number of counts may be dependent upon the background or noise counts, of the entire distribution, and/or of time intervals before light pulses were emitted during the detection periods.

For example, in the histogram 480 shown in FIG. 4B, if peaks are considered to groups of adjacent bins with counts greater than twice the average noise count. Bins with greater than 200 counts per time interval are considered to be comprised by a peak. The earliest peak therefore occupies the 2.5-2.6 to 3.1-3.2 nanosecond bins, with a peak in the 2.8-2.9 nanosecond bin, and a total count of approximately 2950 counts, or approximately 2350 counts when adjusted to remove background noise.

When multiple peaks 484, 486 are comprised by the histogram 480, the separation in time between the peaks may be measured, for example between the bins comprising their maximum value. This separation time may be used to calculate the distance travelled by light incident on (for example, focused on) the one or more photodetectors whose photon detections are counted in the histogram. In the histogram 480 shown in FIG. 4B, the earliest peak is in the 2.8-2.9 nanosecond bin and the second peak is in the 18.0-18.1 nanosecond bin. They are therefore separated by 15.2 nanoseconds. The time for light to travel to the target whose reflections produced the second peak 484 is therefore 7.6 nanoseconds and the calculated distance between the cover and the target is therefore 2.28 meters (to 3 significant figures).

The embodiments have been described by way of example only, and it will be appreciated that variation may be made to the embodiments described above without departing from the scope of the invention as defined by the claims.

The invention claimed is:

1. A method of measuring optical crosstalk in a time of flight sensor comprising a substantially transparent cover covering a light emitter and one or more photodetectors, the method comprising:

emitting a series of pulses of light from the light emitter;
using the one or more photodetectors to obtain a distribution of times at which at least one photodetector of the one or more photodetectors detected photons after each emission of the series of pulses of light, wherein the distribution is obtained over a plurality of detection periods, each detection period containing an emission of one of the pulses of light and being divided into an identical series of time intervals relative to the emission, by counting a total number of photons detected by the at least one photodetector during instances of each time interval across the plurality of detection periods; and if the distribution comprises two or more separate peaks, recording one or more parameters of the earliest peak.

2. A method according to claim 1 wherein the distribution of times is a distribution of times at which at least one photodetector of the one or more photodetectors detected photons before, during and after each emission of the pulses of light.

3. A method according to claim 1 wherein the times at which the at least one photodetector detected photons are relative to an emission of one of the series of pulses of light during or immediately preceding a detection period in which the photon was detected.

4. A method according to claim 1 wherein a counted number of photons detected by the one or more photodetectors during all of the time intervals at each of the plurality of times are or contribute to values of the distribution for time intervals at the plurality of times.

5. A method according to claim 4 wherein each time interval of the plurality of time intervals has a substantially equal duration.

6. A method according to claim 1 wherein the series of pulses of light comprises at least 75,000 light pulses.

7. A method according to claim 1 wherein the distribution is a histogram.

8. A method according to claim 1 wherein peaks are parts of the distribution above a predetermined threshold.

9. A method according to claim 8 wherein two peaks are determined to be separate if the earliest peak is within a predetermined cover reflection peak window and the later peak is separated from the earlier peak by at least a predetermined length of time.

10. A method according to claim 1 wherein the one or more recorded parameters comprise at least one of the time in the distribution at which the peak occurs, the area of the peak, the height of the peak, the width in time of the peak, the full width of the peak at half its maximum height, the shape of the peak.

11. A method according to claim 1 comprising the additional step of, if the distribution comprises two or more separate peaks, determining the separation in time between the earliest peak and at least one of the one or more other peaks.

12. A method according to claim 1 wherein the light emitter is a vertical-cavity surface-emitting laser.

13. A method according to claim 1 wherein each of the one or more photodetectors is a single photon avalanche diode.

14. A method according to claim 1 wherein the one or more photodetectors are a plurality of photodetectors, and are used to obtain a plurality of distributions, each distribution being the distribution of times at which at least one photodetector of the plurality of photodetectors detected photons after each emission of the emissions of the pulses of light.

15. A method according to claim 1, wherein the light emitter forms part of an optical stack and where the method calibrates the time of flight sensor in conjunction with the optical stack.

16. A time of flight sensor configured to perform a method comprising:

emitting a series of pulses of light from the light emitter;

using the one or more photodetectors to obtain a distribution of times at which at least one photodetector of the one or more photodetectors detected photons after each emission of the series of pulses of light, wherein the distribution is obtained over a plurality of detection periods, each detection period containing an emission of one of the pulses of light and being divided into an identical series of time intervals relative to the emission, by counting a total number of photons detected by the at least one photodetector during instances of each time interval across the plurality of detection periods, and if the distribution comprises two or more separate peaks, recording one or more parameters of the earliest peak.

17. A device comprising a sensor according to claim 16.

18. A non-transitory storage medium comprising computer instructions executable by one or more processors comprised by or in communication with a time of flight sensor comprising a substantially transparent cover covering a light emitter and one or more photodetectors, the computer instructions when executed by the one or more processors causing the time of flight sensor to perform a method comprising:

emitting a series of pulses of light from the light emitter;

using the one or more photodetectors to obtain a distribution of times at which at least one photodetector of the one or more photodetectors detected photons after each emission of the series of pulses of light, wherein the distribution is obtained over a plurality of detection periods, each detection period containing an emission of one of the pulses of light and being divided into an identical series of time intervals relative to the emission, by counting a total number of photons detected by the at least one photodetector during instances of each time interval across the plurality of detection periods, and if the distribution comprises two or more separate peaks, recording one or more parameters of the earliest peak.

* * * * *